United States Patent [19]
Chiang

[11] Patent Number: 5,991,147
[45] Date of Patent: Nov. 23, 1999

[54] ELECTROMAGNETIC CHUCK WITH MAGNETIZING/DEMAGNETIZING CIRCUIT

[76] Inventor: Wen-Hsuan Chiang, No. 24, Lane 123, Sec. 1, Tung Shan Rd., Taichung, Taiwan

[21] Appl. No.: 08/887,732

[22] Filed: Jul. 3, 1997

[51] Int. Cl.⁶ ............................................. H01F 13/00
[52] U.S. Cl. ........................... 361/267; 361/145; 361/149
[58] Field of Search ..................... 361/143–145, 361/149–151, 267; 335/284, 285–295; 279/128

[56] References Cited

U.S. PATENT DOCUMENTS

| | | | |
|---|---|---|---|
| Re. 15,884 | 8/1924 | Coradi ..................................... | 335/289 |
| 1,339,553 | 5/1920 | Dunbar ................................... | 335/289 |
| 2,348,967 | 5/1944 | Duby ....................................... | 335/290 |
| 3,111,607 | 11/1963 | Storch .................................... | 361/144 |
| 4,370,693 | 1/1983 | McDonald et al. ..................... | 361/145 |
| 4,399,482 | 8/1983 | Inoue ...................................... | 361/145 |
| 4,402,032 | 8/1983 | Wilterdink ............................... | 361/145 |
| 4,462,059 | 7/1984 | Yamagami et al. ..................... | 361/149 |
| 4,591,943 | 5/1986 | Armond .................................. | 361/145 |
| 4,684,112 | 8/1987 | Chernikov et al. ..................... | 335/289 |
| 4,847,582 | 7/1989 | Cardone et al. ........................ | 335/289 |
| 4,956,625 | 9/1990 | Cardone et al. ........................ | 335/290 |
| 5,047,742 | 9/1991 | Hsu ......................................... | 335/289 |
| 5,267,119 | 11/1993 | Armond et al. ......................... | 361/145 |

*Primary Examiner*—Fritz Fleming
*Attorney, Agent, or Firm*—Merchant & Gould P.C.

[57] ABSTRACT

An improved electromagnetic chuck which does not require a continuous direct current supply while being magnetized, including a main body defining a plurality of recesses and forming a cover, which includes a plurality of magnetically conductive portions and non-magnetically conductive portions alternately arranged, a plurality of magnetic units arranged within said plurality of recesses, and a magnetizing/demagnetizing circuit for magnetizing/demagnetizing said plurality of magnetic units, is provided. The magnetizing/demagnetizing circuit includes a magnetizing circuit, a demagnetizing circuit and an output circuit, by which a direct current is generated to magnetize the electromagnetic chuck, or a pair of positive and negative phase pulses with a gradually increased frequency is generated to quickly demagnetize the electromagnetic chuck.

18 Claims, 11 Drawing Sheets

ELECTROMAGNETIC CHUCK WITH MAGNETIZING/DEMAGNETIZING CIRCUIT

BACKGROUND OF THE INVENTION

1. Field of the Invention

The present invention relates to a magnetic device and, more particularly, to an improved electromagnetic chuck. The present invention discloses a high speed magnetizing/demagnetizing circuit used for the electromagnetic chuck.

2. Description of Related Art

In conventional machines such as electrical discharge machining (EDM) machines and grinding machines, a magnetic chuck is frequently used as a worktable, whereby a workpiece to be machined can be attracted upon the worktable by a magnetic force and then a machining operation is performed on the workpiece.

As known in the prior art, there are presently two types of magnetic chucks: permanent-magnetic chucks and electromagnetic chucks.

A permanent-magnetic chuck generally utilizes a plurality of permanent magnets. The magnetism of the permanent-magnetic chuck is determined according to the distance between the plurality of permanent magnets and the surface of the chuck as well as the arrangement of the plurality of permanent magnets.

The permanent-magnetic chuck utilizes magnets with a lower magnetic saturation point, so as to avoid resulting in significant residual magnetism on the workpiece and the surface of the chuck and thus making it difficult to remove the workpiece after the chuck is magnetically insulated. Therefore, permanent-magnetic chucks can merely be applied to machining applications with a low magnetic force demand.

An electromagnetic chuck applies the electromagnetic induction theory to generate magnetic force in order to attract a workpiece to be machined onto the surface of the chuck.

Conventionally, one drawback of the electromagnetic chuck is that it needs to be continuously provided with electric power so as to maintain its magnetic force. The magnetic units disposed within the electromagnetic chuck for generating the magnetic force gradually increase in temperature after an extended period of use. Such a rise in temperature will result in the deformation of the surface of the is electromagnetic chuck, that is, the flatness of the surface will become degraded.

In addition, the magnetic force generated by the electromagnetic chuck will dissipate when the coils of the magnetic units in the electromagnetic chuck are damaged, the power supply of the electromagnetic chuck is defective or the power is abruptly cut off, resulting in the workpiece to be machined being outwardly projected since the workpiece is still subject to the inertial force of the machining tool. Thus, it may damage the workpiece and injure the operator.

Furthermore, as the electromagnetic chuck needs to be firstly magnetized to attract a workpiece and then demagnetized after a workpiece has been machined, a magnetizing/demagnetizing circuit is usually employed. In conventional magnetizing/demagnetizing circuits, a direct current is generated to flow through the coils winding around a material to be magnetized in order to magnetize the material, and a gradually decreased voltage alternating between positive and negative via a relay is generated to apply to the coils winding around the magnetized material in order to demagnetize the material.

However, it is well known that the relay itself has several drawbacks such as operation with a time delay, large operational error and slow operational speed. The frequency of the alternating polarity of the applied voltage is low due to the slow operational speed of the relay, thus the time required to demagnetize the material is relatively prolonged (about 8 to 15 seconds).

Conventionally, the residual magnetism remaining within the magnetized material can not be minimized since the frequency of the alternating polarity provided by the relay is low. Thus, the conventional demagnetization performance is undesirable because the material may be incompletely demagnetized and the workpiece attracted onto the electromagnetic chuck may need to be separately demagnetized.

SUMMARY OF THE INVENTION

One object of the present invention is to provide an improved electromagnetic chuck which does not require a continuous direct current (DC) supply and is able to maintain its magnetism so as to conserve the required electric power and further ensure the integrity of the workpiece and the safety of the operator.

Another object of the present invention is to provide an improved electromagnetic chuck in which the resulting surface deformation can be minimized, that is, the flatness of its surface will not become degraded.

A further object of the present invention is to provide a magnetizing/demagnetizing circuit which can achieve a high speed demagnetization of a magnetized material, for example within about 1.5 to 3 seconds, so as to minimize the residual magnetism remaining within the magnetized material and thereby improving the demagnetization performance.

To achieve the above objects, in accordance with one aspect of the present invention, an improved electromagnetic chuck comprises a main body comprising a base made of a magnetically conductive material and defining a plurality of recesses and a cover comprised of a plurality of magnetically conductive portions and non-magnetically conductive portions alternately arranged, a plurality of magnetic units each consisting of a permanent-magnetic material and a coil wrapped around the permanent-magnetic material and each being arranged in a recess corresponding to a magnetically conductive portion of the cover, and a magnetizing/demagnetizing circuit electrically connected with the coils of the magnetic units for magnetizing (or demagnetizing) each permanent-magnetic material of each magnetic unit.

In accordance with another aspect of the present invention, a main body of an improved electromagnetic chuck comprises a base made of a non-magnetically conductive material and a cover comprised of a plurality of magnetically conductive portions and non-magnetically conductive portions alternately arranged and defining a plurality of recesses.

In accordance with a further aspect of the present invention, a main body of an improved electromagnetic chuck comprises a base made of a magnetically conductive material and defining a plurality of recesses, and a cover comprised of a plurality of magnetically conductive portions and non-magnetically insulating portions alternately arranged and also defining a plurality of recesses.

In accordance with still a further aspect of the present invention, a magnetizing/demagnetizing circuit comprises a magnetizing circuit, a output circuit, and a demagnetizing circuit comprised of a linear voltage oscillation generator generating a signal with a gradually increased frequency and a frequency divider outputting a pair of positive and negative phase voltage signals.

Other objects, advantages and novel features of the invention will become more apparent from the following detailed description when taken in conjunction with the accompanying drawings.

DETAILED DESCRIPTION OF PREFERRED EMBODIMENT

Figure 1:
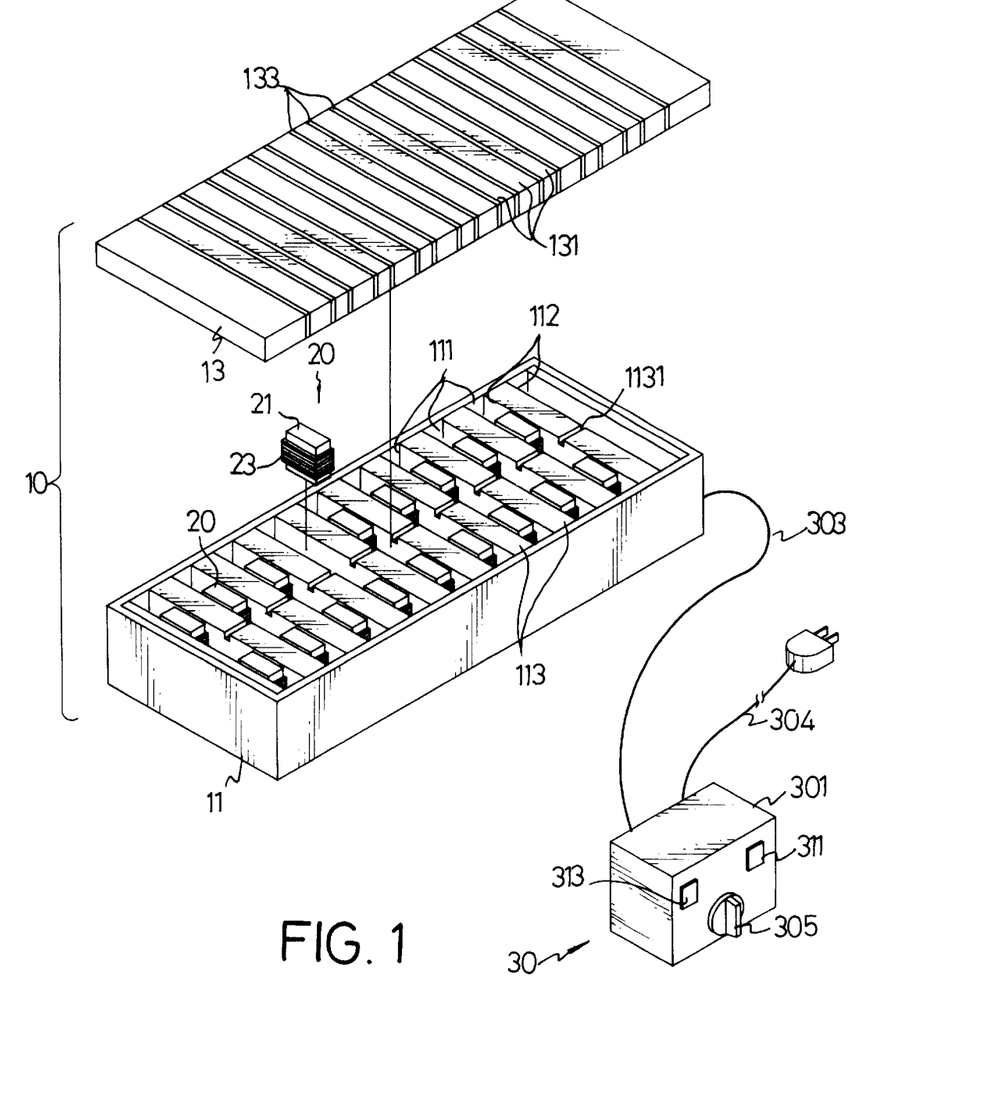
FIG. 1 is a perspective view of an unassembled electromagnetic chuck in accordance with a first embodiment of the invention.

Referring to FIGS. 1 to 4, an electromagnetic chuck according to a first embodiment of the invention is illustrated. As shown in FIG. 1, the electromagnetic chuck comprises a main body 10 comprised of a base 11 and a cover 13, a plurality of magnetic units 20 and a magnetizing/demagnetizing circuit 30.

The base 11 is made of a magnetically conductive material, such as carbon steel, with a substantially rectangular shape. The base 11 defines a plurality of recesses 111 and forms a plurality of protrusions 113 alternately arranged. The cover 13 has a flat top surface and is comprised of a plurality of magnetically conductive portions 131 and non-magnetically conductive portions 133 alternately arranged and adhered together. The non-magnetically conductive portions 133 may be made of copper, aluminum or wood.

Figure 2:
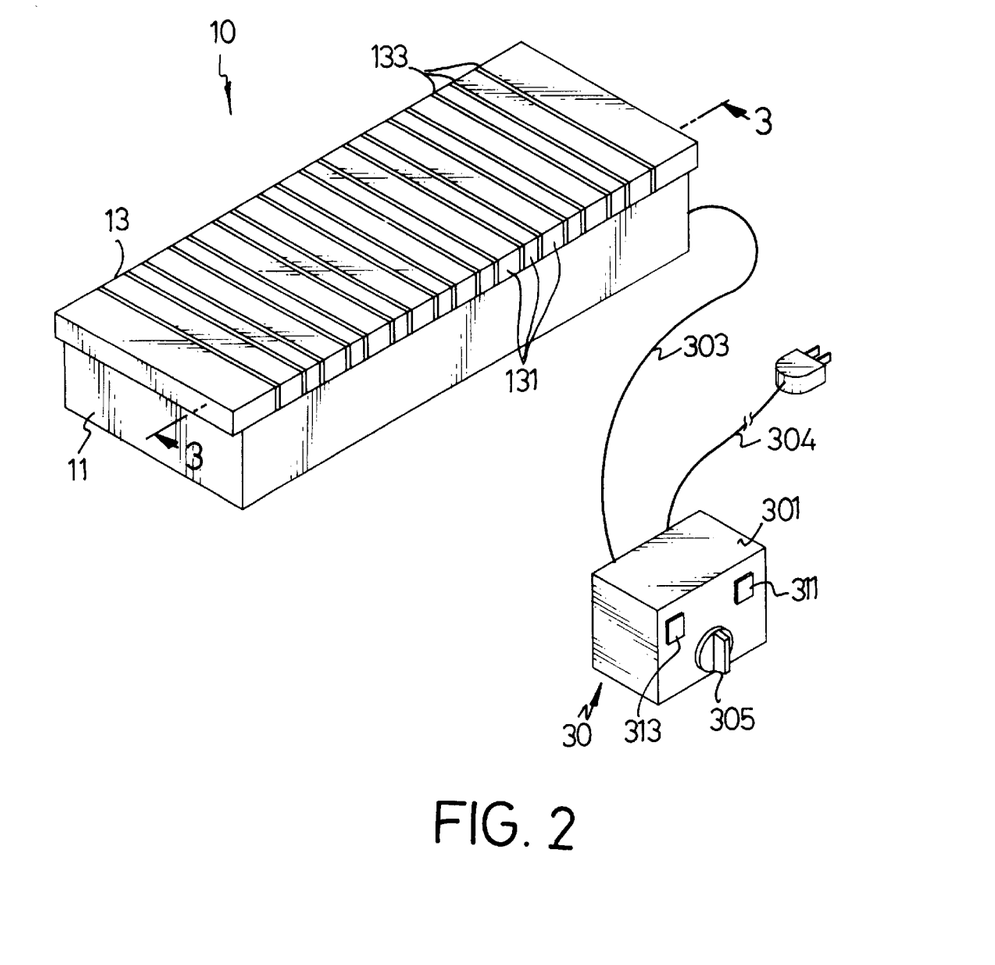
FIG. 2 is a perspective view of the assembled electromagnetic chuck of FIG. 1.
Figure 3:
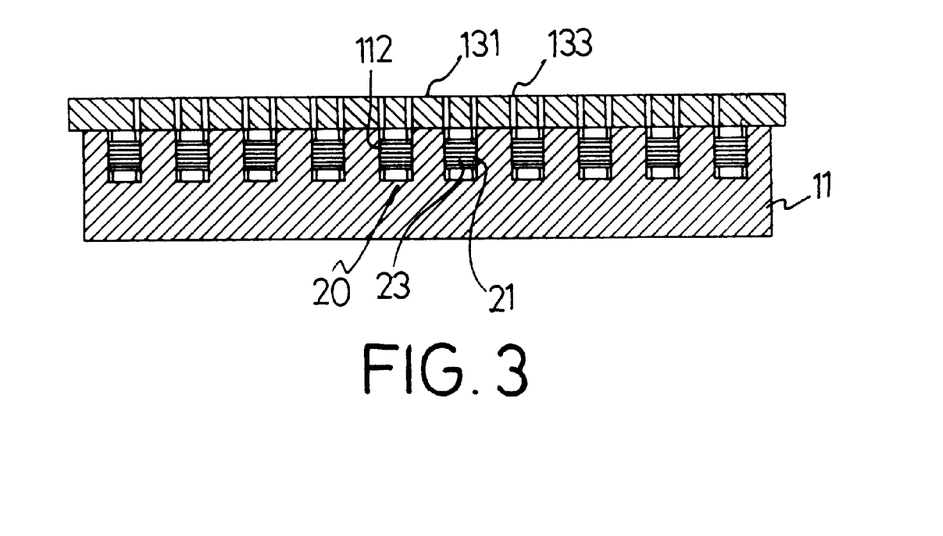
FIG. 3 is a sectional view taken from the line 3—3 of FIG. 2.

As shown in FIGS. 2 and 3, the top surface of the base is assembled with the cover 13 such that the magnetically conductive portions 131 of the cover 13 correspond to the recesses 111 and the protrusions 113 of the base 11 and the non-magnetically conductive portions 133 of the cover 13 correspond to borderlines 112 defined along the side surface of each of the protrusions 113 of the base 11.

A plurality of magnetic units 20 are arranged within the recesses 111 of the base 11, for example, two magnetic units 20 are disposed within each recess 111. Each magnetic unit 20 comprises a permanent-magnetic material 21, such as an oxide of iron, aluminum, nickel or cobalt material, and a coil 23 winding around the periphery of the permanent-magnetic material 21. The top surface of each permanent-magnetic material 21 corresponds to a magnetically conductive portion 131 of the cover 13, while the bottom surface of each permanent-magnetic material 21 corresponds to a recess 111 of the base 11.

Figure 4:
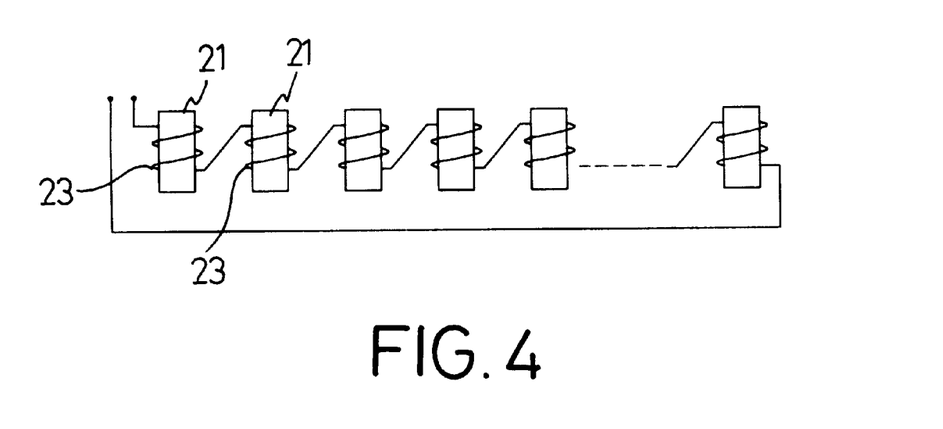
FIG. 4 schematically illustrates the connection of the coils of FIG. 3

The coils 23 are serially connected together in an integral circuit loop as shown in FIG. 4. Preferably, as shown in FIG. 1, the top surface of each protrusion 113 defines a slot 1131 so as to create a path for receiving the coils 23 to facilitate the connection between each magnetic unit 20 disposed in an adjacent recess 111.

Preferably, the gaps between the base 11 and the cover 13 may be filled with a non-magnetically conductive material such as resin.

According to the arrangement in the above Figures, a magnetizing current generated by the magnetizing/demagnetizing circuit 30 is applied to the coils 23 of the magnetic units 20, then the molecules within the permanent-magnetic materials 21 will be arranged in a specific orientation so that the magnetic units 20 will become magnetized. Thus, the magnetically conductive portions 131 of the cover 13 are made a plurality of N and S poles alternately arranged.

The magnetizing/demagnetizing circuit 30 (shown in FIGS. 1 and 2) is arranged in a casing 301. The magnetizing/demagnetizing circuit 30 is electrically connected with the coils 23 of the magnetic units 20 via an output wire 303 so as to magnetize or demagnetize the magnetic units 20, and is electrically connected with the external electric power source via an input wire 304. A magnetizing switch 311, a demagnetizing switch 313 and a power switch 305 are mounted on the front panel of the casing 301.

Figure 5:
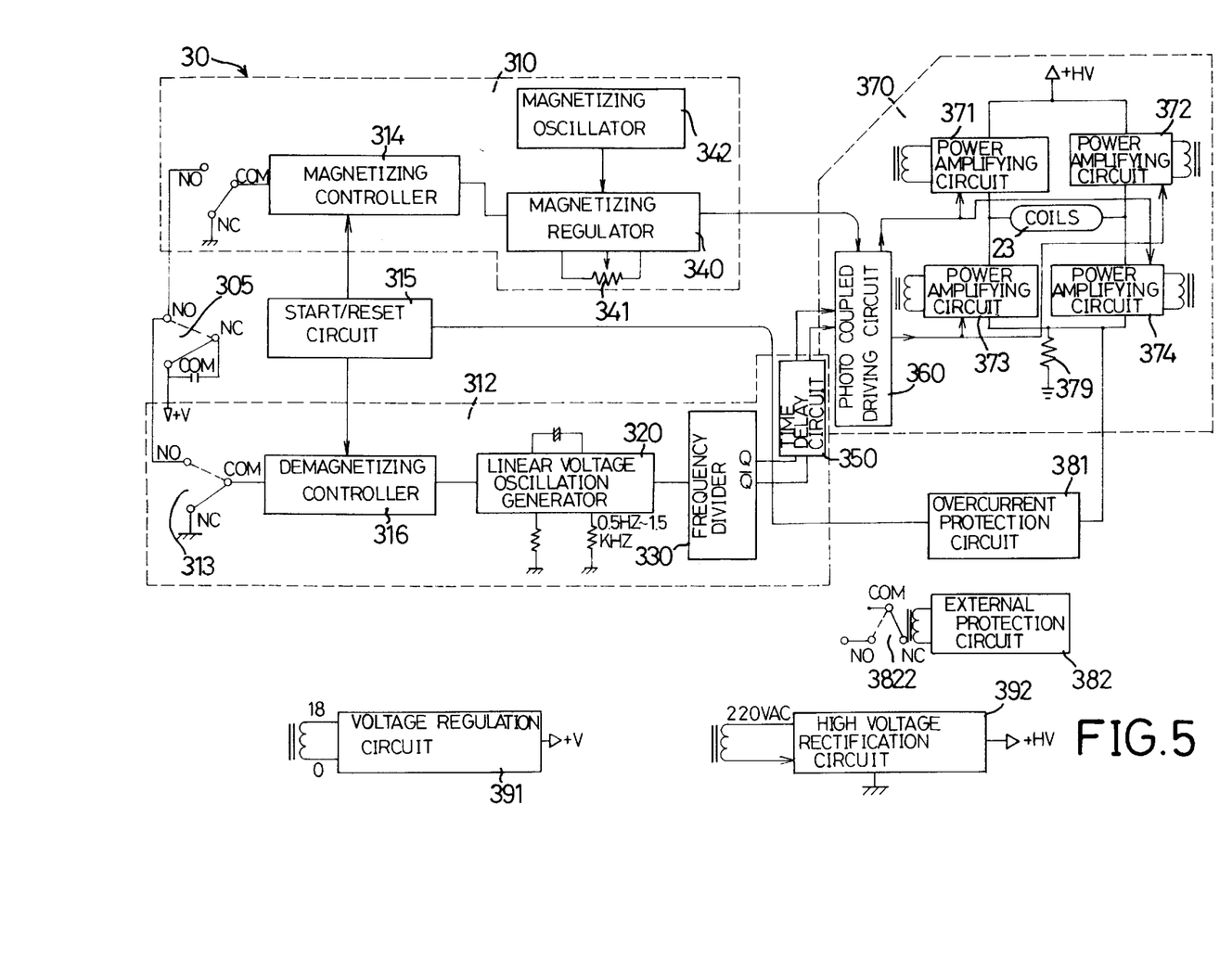
FIG. 5 is a block diagram for illustrating a magnetizing/demagnetizing circuit in accordance with the present invention.

Referring to FIG. 5, a block diagram of the magnetizing/demagnetizing circuit 30 in accordance with the present invention is schematically illustrated. The magnetizing/demagnetizing circuit 30 comprises a power switch 305, a magnetizing circuit 310, a demagnetizing circuit 312, an output circuit 370, a start/reset circuit 315, and an overcurrent protection circuit 381.

The magnetizing circuit 310 further comprises a magnetizing switch 311, a magnetizing controller 314, a magnetizing oscillator 342, a variable resistor 341 and a magnetizing regulator 340. The demagnetizing circuit 312 further comprises a demagnetizing switch 313, a demagnetizing controller 316, a linear voltage oscillation generator 320, a frequency divider 330 and a time delay circuit 350.

For magnetization of the magnetic units 20, the magnetizing switch 311 is firstly switched to its normal open (NO) contact, then the magnetizing regulator 340 is activated by the magnetizing controller 314. The output circuit 370 is driven by the magnetizing regulator 340 and generates a direct current to apply to the coil 23. As a result, the magnetic units 20 are thus magnetized. A further discussion will be given below with reference to FIGS. 6a and 6b.

Since the magnetism of the permanent-magnetic material 23 can last for an extended period, the magnetizing current flowing through the coils 23 can be cut off by switching the power switch 305 from its normal open (NO) contact to its normal close (NC) contact after the magnetic units 20 are already magnetized.

Therefore, the electric power required for magnetizing the material can be minimized, the flatness of the surface of the electromagnetic chuck can be maintained, and the integrity of the workpiece and the safety of the operator can be ensured.

In addition, the variable resistor 341 can adjust the magnitude of the magnetizing current. The output circuit 370 comprises a photo-coupled driving circuit 360 and four sets of power amplifying circuits 371 to 374 which are preferably arranged as a bridge.

Figure 7A:
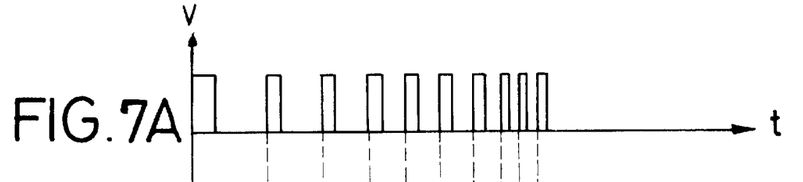
FIGS. 7A to 7F are timing diagrams for illustrating the operation of demagnetization in accordance with the invention.
Figure 7B:
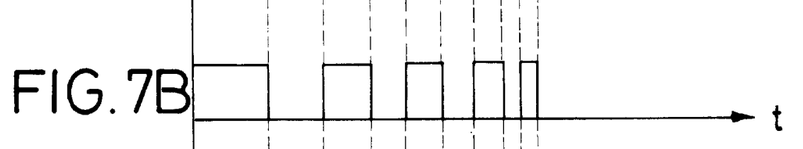
Figure 7C:
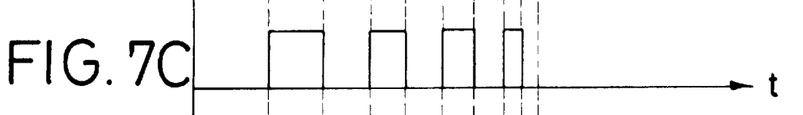

For demagnetization of the magnetic units 20, the demagnetizing switch 313 is firstly switched to its normal open (NO) contact, then the linear voltage oscillation generator 320 is activated by the demagnetizing controller 316 and generates a series of pulses with a gradually increased frequency (as shown in FIG. 7A), e.g., from 0.5 Hz to 1.5 KHz. The frequency of the generated pulse signals is divided by the frequency divider 330, and a pair of positive and negative phase signals (as shown in FIGS. 7B and 7C) are output from the frequency divider 330 to the time delay circuit 350. The time delay circuit 350 will respectively add an appropriate time delay on the pair of positive and negative phase signals from the frequency divider 330.

Figure 7D:
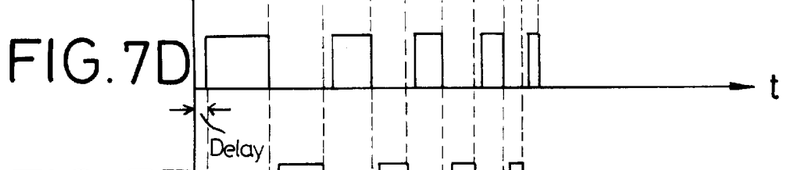
Figure 7E:
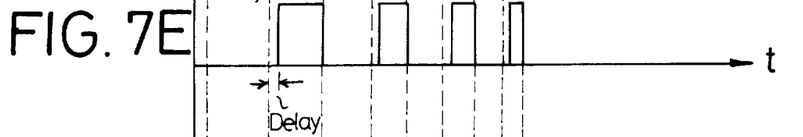
Figure 7F:
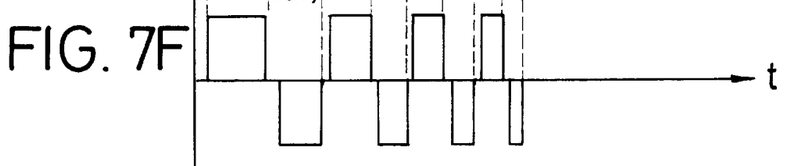

The positive and negative phase signals with a time delay (as shown in FIGS. 7D and 7E) are then sent to the output circuit 370. Since the coil 23 itself is an inductive load, the impedance of the coil 23 increases as the frequency increases. Thus, the phase of the current through the coil 23 is alternately switched while the output power is gradually decreased (as shown in FIG. 7F).

As a result, the magnetic units 20 can be demagnetized at a high speed, for example, the demagnetization of the magnetic units 20 can be achieved within about 1.5 to 3 seconds.

In FIG. 5, the overcurrent protection circuit 381 is connected between the start/reset circuit 315 and the detection resistor 379 of the output circuit 370. When the overcurrent protection circuit 381 senses that the terminal voltage of the detection resistor 379 is too high, i.e. the current output from the output circuit 370 is too large, a signal is sent to the start/reset circuit 315 and the operation of the magnetizing controller 314 (or that of the demagnetizing controller 316) is terminated. Thus, an overcurrent protection for the magnetizing/demagnetizing circuit 30 and the coils 23 can be achieved.

An external protection circuit 382 can be electrically connected to the external circuits via a relay 3822. When an overcurrent is generated, a signal can be sent to other external control circuits through the external contacts of the relay 3822.

The start/reset circuit 315 can reset the magnetizing controller 314 and the demagnetizing controller 316 when the magnetizing/demagnetizing circuit 30 is powered on. A voltage regulation circuit 391 and a high voltage rectification circuit 392 respectively provide a low DC voltage denoting "+V" and a high DC voltage denoting "+HV". In addition, the power switch 305 can provide protection for preventing the operator (or other persons) from mistakenly switching the magnetizing switch 311 or the demagnetizing switch 313.

Figure 6A:
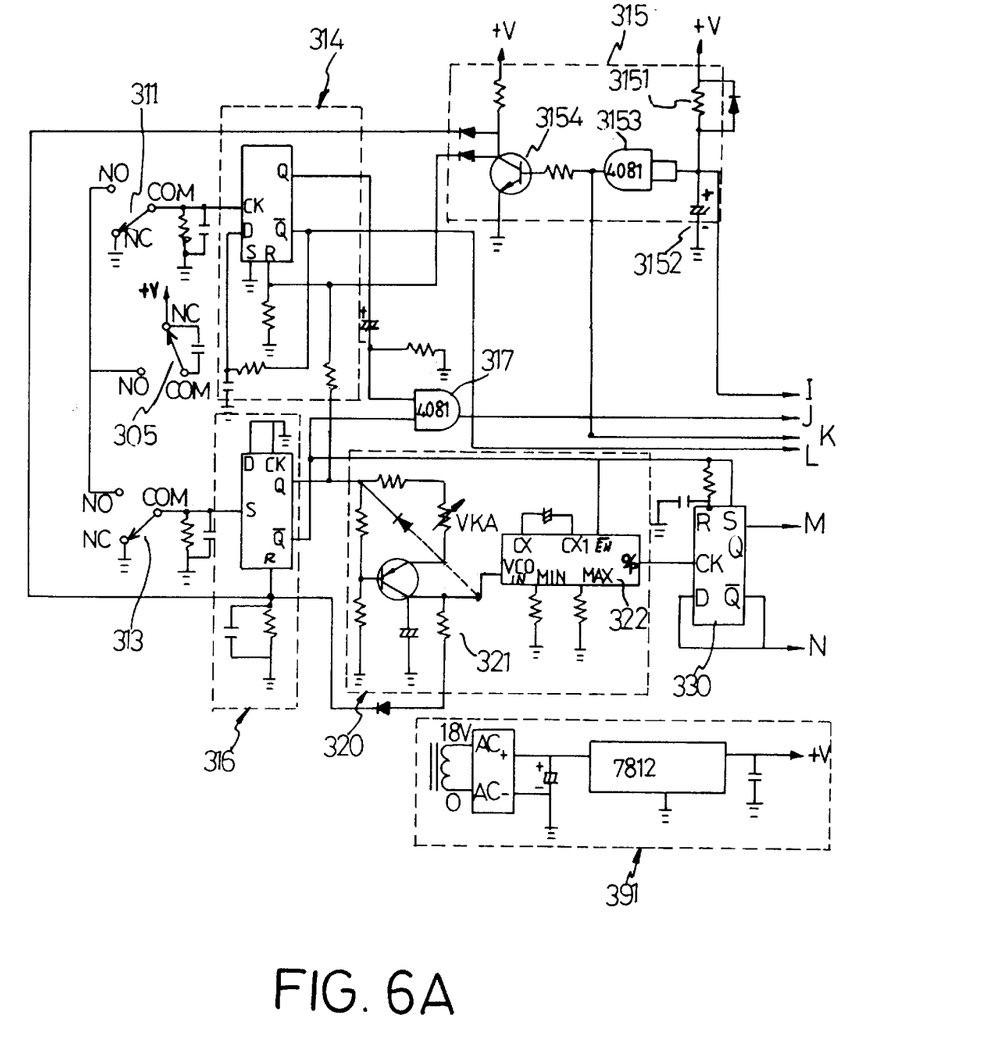
FIGS. 6A and 6B together show a detailed circuit diagram for embodying the magnetizing/demagnetizing circuit of FIG. 5.
Figure 6B:
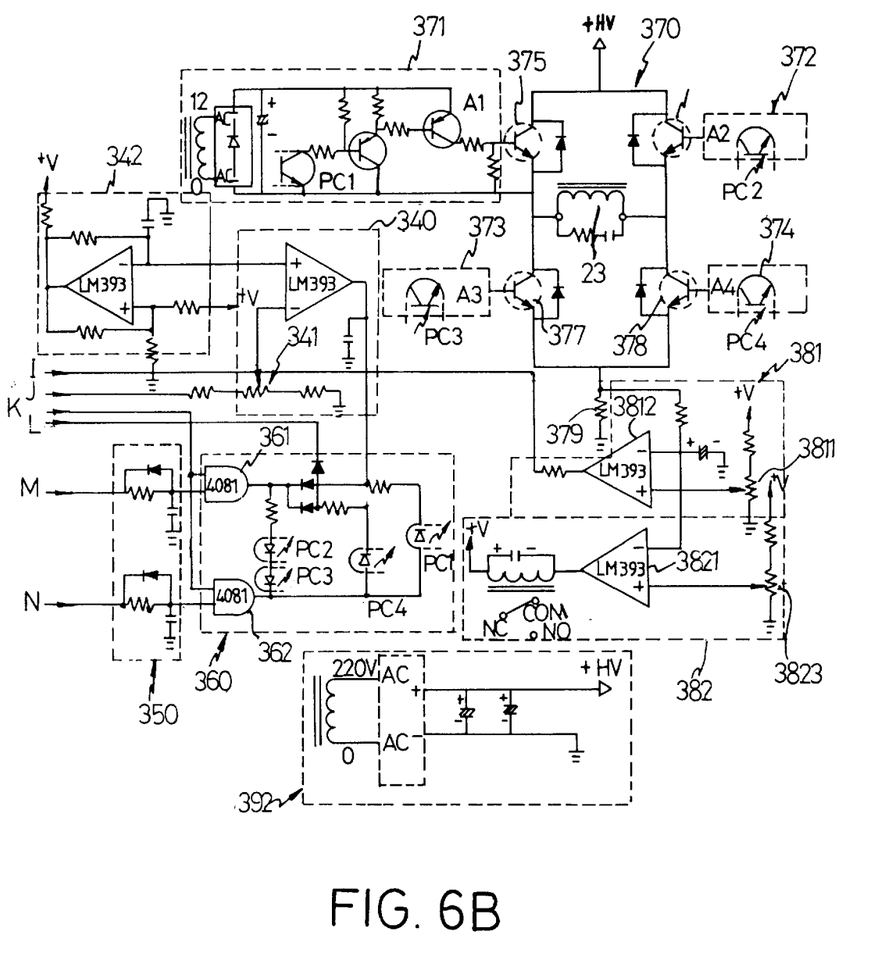

Referring to FIGS. 6A and 6B, a detailed circuit for embodying the magnetizing/demagnetizing circuit 30 of FIG. 5 is shown. The magnetizing controller 314 and the demagnetizing controller 316 respectively comprise a D-type (delay) flip-flop. The start/reset circuit 315 comprises a resistor 3151, a capacitor 3152, an AND gate 3153 and a transistor 3154, wherein the resistor 3151 and the capacitor 3152 constitute a time delay constant. A reset signal is generated by the start/reset circuit 315 and is sent to the magnetizing controller 314 and the demagnetizing controller 316.

The positive phase output signal of the magnetizing controller 314 is sent to the variable resistor 341 of the magnetizing regulator 340 through an AND gate 317. The width of the output waveform from the magnetizing regulator 340 is determined by comparing the voltage signal sent from the variable resistor 341 with the basic waveform generated by the magnetizing oscillator 342 which is comprised of a comparator and other passive elements.

It should be noted that the magnetizing power resulting from the magnetizing circuit 31 is determined by the width of the output waveform from the magnetizing regulator 340.

The output signal of the magnetizing regulator 340 is sent to a photo-coupler PC1 of the photo-coupled driving circuit 360. Another photo-coupler PC4 of the photo-coupled driving circuit 360 is driven by the negative phase output signal of the magnetizing controller 314. The photo-couplers PC1 and PC4 cooperate to respectively trigger the amplification circuits 371 and 374 in the output circuit 370. Then, the amplification circuits 371 and 374 will respectively drive the high voltage transistors 375 and 378 so that a forward current flows through the coils 23, and the magnetic units 20 can be thus magnetized.

The overcurrent protection circuit 381 comprises a variable resistor 3811 and a comparator 3812. The external protection circuit 382 comprises a variable resistor 3823 and a comparator 3821. The variable resistors 3811 and 3823 respectively adjust the reference levels for the comparators 3812 and 3821. When the terminal voltage of the detection resistor 379 in the output circuit 370 is too high, i.e. an overcurrent is generated, the operation of the magnetizing controller 314 or the demagnetizing controller 316 will be reset via the start/reset circuit 315, and a signal can be sent to other external control circuits through the relay 3822.

The linear oscillation generator 320 is electrically connected with the demagnetizing controller 316 and comprises a sawtooth wave generator 321 and a voltage controlled oscillator (VCO) 322. The sawtooth wave generator 321 outputs a voltage signal with a gradually increased magnitude to the voltage controlled oscillator 322 which generates a series of pulses with a gradually increased frequency.

The series of pulses output from the voltage controlled oscillator 322 is used as a clock signal for the frequency divider 330 comprising a D-type flip-flop. The frequency divider 330 generates a pair of positive and negative phase signals with a divided frequency and is electrically connected to the time delay circuit 350. The time delay circuit 350 comprises two sets of resistor and capacitor (RC) circuits each constituting a time delay.

The photo-coupled driving circuit 360 comprises two AND gates 361 and 362 and four sets of photo-couplers PC1–PC4 electrically connected between the outputs of the AND gates 361 and 362. The output circuit 370 is driven by the photocoupled driving circuit 360. The voltage regulation circuit 391 comprises a regulator and a filter. The high voltage rectification circuit 392 comprises a rectifier and a filter.

With reference to FIGS. 5, 6A and 6B, the present invention provides an improved magnetizing/demagnetizing circuit 30 which generates a demagnetizing current having a gradually increased frequency with alternating positive and negative phases. The circuit 30 can achieve a high speed demagnetization of a magnetized material, for example within about 1.5 to 3 seconds, thereby improving the demagnetization performance.

Figure 8:
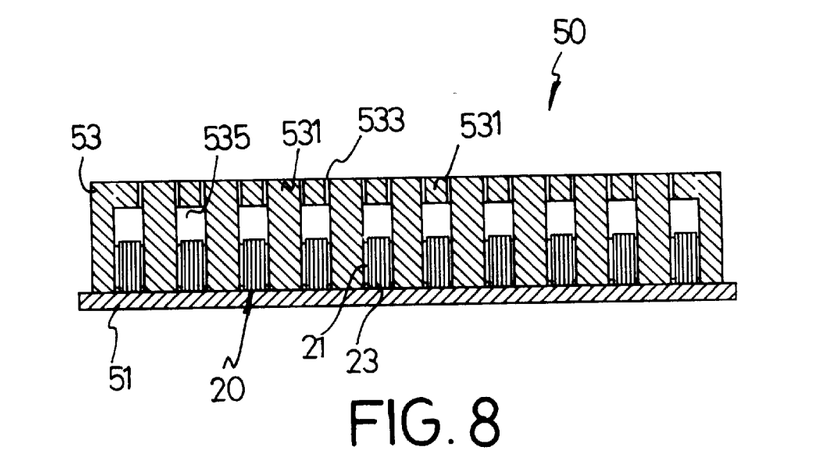
FIG. 8 is a sectional view for illustrating an electromagnetic chuck in accordance with a second embodiment of the invention.
Figure 9:
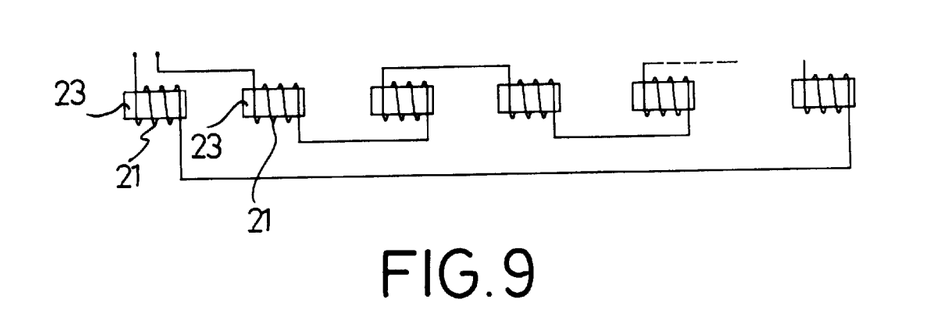
FIG. 9 schematically illustrates the connection of the coils of FIG. 8.

Referring to FIGS. 8 and 9, an electromagnetic chuck according to a second embodiment of the invention is schematically illustrated.

A main body 50 of the electromagnetic chuck comprises a plate-like base 51 and a cover 53. The base 51 is made of a non-magnetically conductive material and is provided with a flat top surface. The cover 53 forms a plurality of magnetically conductive portions 531 and non-magnetically conductive portions 533 alternately arranged. A plurality of recesses 535 are defined by the magnetically conductive portions 531 of the cover 53.

A plurality of magnetic units 20 are arranged in the recesses 535 of the cover 53, and each magnetic unit 20 comprises a permanent-magnetic material 21 and a coil 23. All of the coils 23 are serially connected together as an integral circuit loop.

Each permanent-magnetic material 21 is horizontally disposed in the corresponding recess 535 of the cover 53 so that the top and bottom surfaces of each permanent-magnetic material 21 are adjacent to the sides of the magnetically conductive portions 531.

The polarity of each magnetically conductive portion 531 is determined by the winding direction of the coils 23 as well as their arrangement. Therefore, the different polarities of the magnetically conductive portions 531 result in the arrangement of the poles on the surface of the electromagnetic chuck surface, e.g. the top surface of the cover 53.

Referring to FIGS. 10 to 13, an electromagnetic chuck according to a third embodiment of the invention is schematically illustrated.

Figure 10:
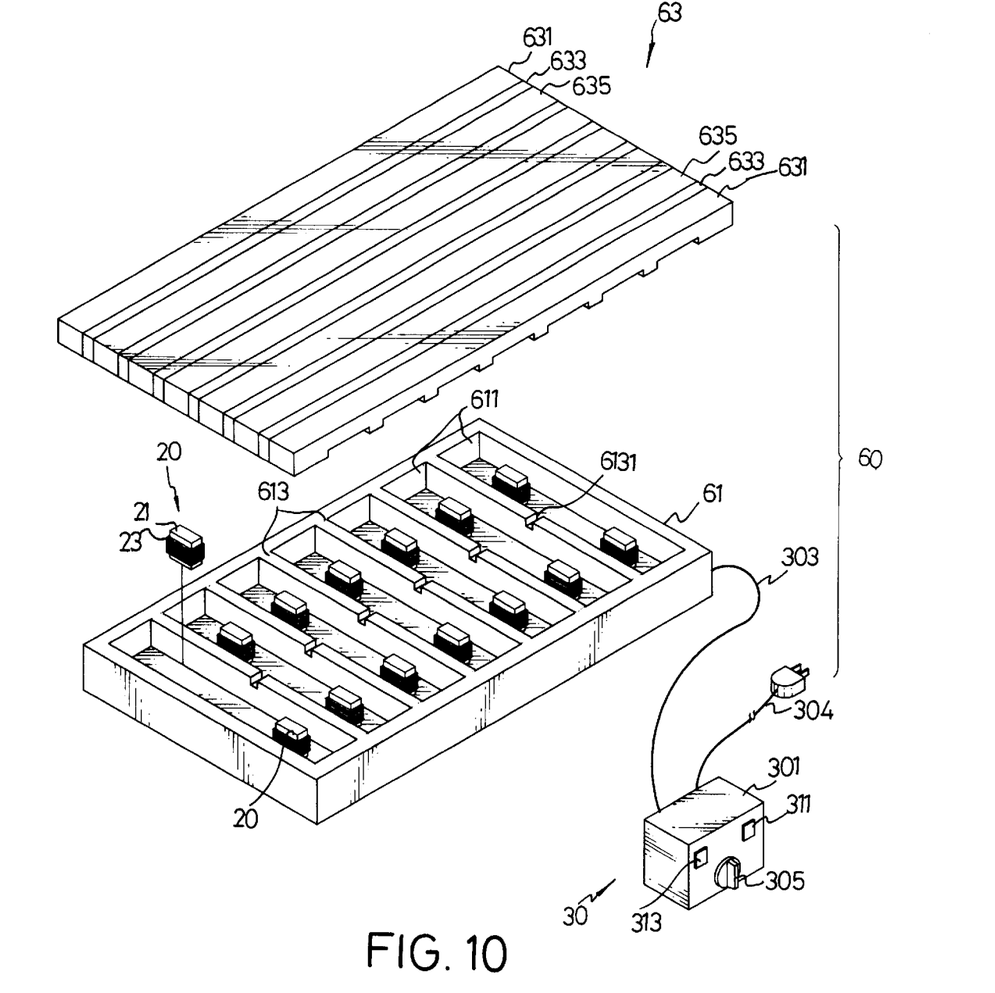
FIG. 10 is a perspective view of an electromagnetic chuck in accordance with a third embodiment of the invention.

As shown in FIG. 10, the electromagnetic chuck comprises a main body 60 comprised of a base 61 and a cover 63, a plurality of magnetic units 20 and a magnetizing/demagnetizing circuit 30.

The base 61 is made of a magnetically conductive material formed in a substantially rectangular shape, and defines a plurality of recesses 611 and forms a plurality of protrusions 613 alternately arranged.

The coils 23 are serially connected together as an integral circuit loop. The top surface of each protrusion 613 defines a slot 6131 so as to create a path for receiving the coils 23.

Figure 11:
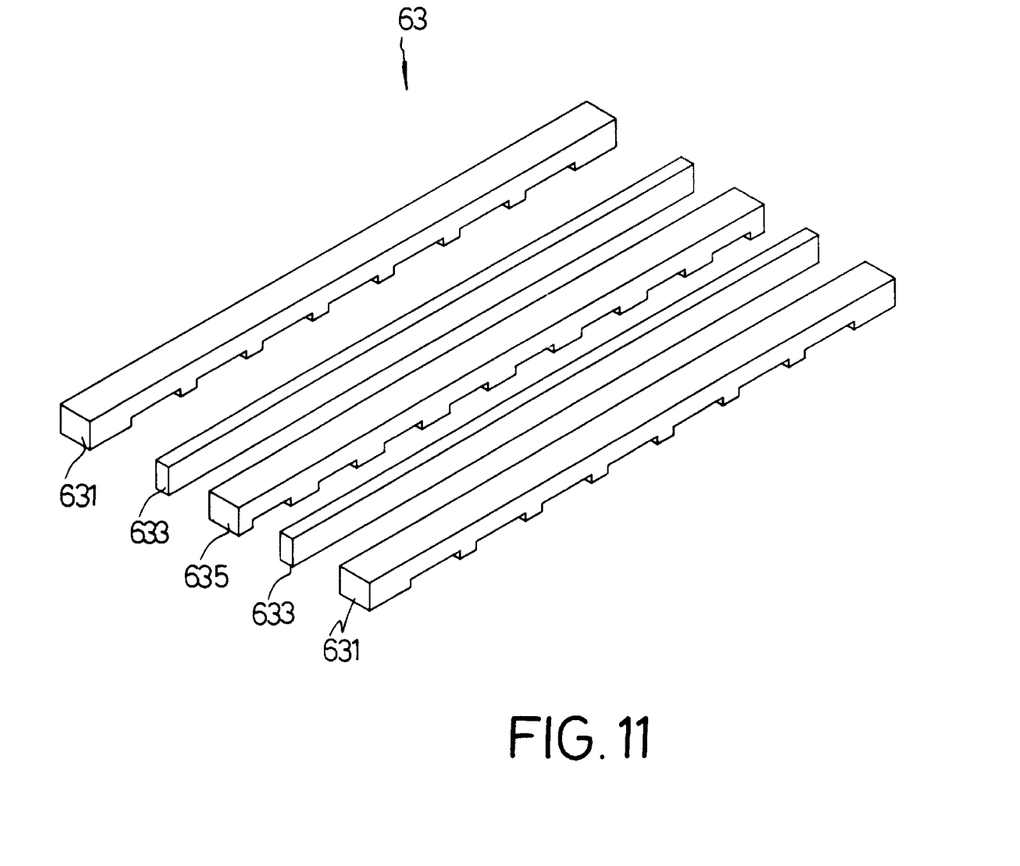
FIG. 11 is an exploded perspective view of a cover of the electromagnetic chuck in accordance with the third embodiment of the invention.

The structure of the cover 63 is described with reference to FIG. 11. The cover 63 is comprised of a plurality of first magnetically conductive portions 631, non-magnetically conductive portions 633 and second magnetically conductive portions 635. The first and second magnetically conductive portions 631 and 635 are shaped differently and are alternately arranged with a non-magnetically conductive portion 633 disposed therebetween so as to define a plurality of recesses in and form a plurality of protrusions on an underside of the cover 63. Furthermore, the front and rear surfaces of the cover 63 are each formed by one of first magnetically conductive portions 631.

Figure 12:
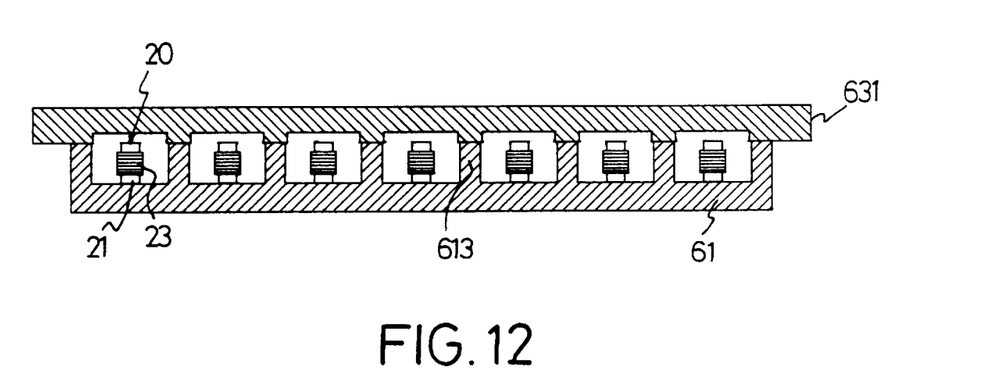
FIG. 12 is a sectional view for illustrating the electromagnetic chuck of FIG. 10.
Figure 13:
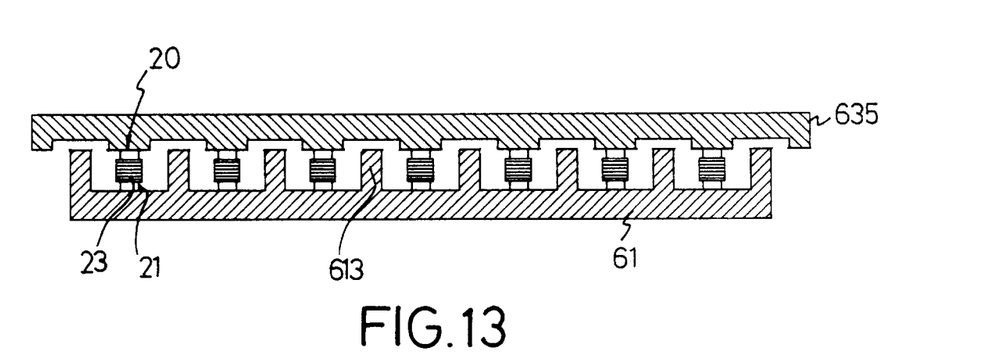
FIG. 13 is another sectional view for illustrating the electromagnetic chuck of FIG. 10.

Referring to FIGS. 12 and 13, the top surface of the base 61 is assembled with the cover 63. The protrusions of the first magnetically conductive portions 631 correspond to the protrusions 613 of the base 61. The protrusions of the second magnetically conductive portions 635 correspond to the permanent-magnetic materials 21 of the magnetic units 20.

The resulting polarity of the first magnetically conductive portions 631 will be different from that of the second magnetically conductive portions 635. Therefore, the different polarities of the first magnetically conductive portions 631 and the second magnetically conductive portions 635 result in the arrangement of the poles on the surface of the electromagnetic chuck, e.g. the top surface of the cover 63.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An improved electromagnetic chuck comprising:

a main body defining a plurality of recesses therein and forming a cover, said cover having a plurality of magnetically conductive portions and non-magnetically conductive portions alternately arranged;

a plurality of magnetic units arranged within said plurality of recesses and corresponding to said plurality of magnetically conductive portions, each magnetic unit having a permanent-magnetic material and a coil around said permanent-magnetic material, said coils of each magnetic unit being serially connected; and a magnetizing/demagnetizing circuit electrically connected with said coils for magnetizing/demagnetizing said plurality of magnetic units, said circuit comprising:

a magnetizing circuit for generating a direct current signal;

a demagnetizing circuit for generating a pair of positive and negative phase pulse signals with a gradually increased frequency, said demagnetizing circuit comprising:

a linear voltage oscillation generator for generating a series of pulse signals with a gradually increased frequency, said linear voltage oscillation generator being comprised of a sawtooth wave generator and a voltage controlled oscillator; and a frequency divider for dividing the frequency of said pair of positive and negative phase signals; and a time delay circuit for respectively adding an appropriate time delay on said pair of positive and negative phase signals from said frequency divider, said time delay circuit being comprised of two sets of resistor and capacitor circuits; and an output circuit electrically connected with said magnetizing circuit and said demagnetizing circuit for outputting said direct current signal or said pair of positive and negative phase pulse signals to said coils of said plurality of magnetic units so as to magnetize or demagnetize said plurality of magnetic units;

wherein a magnetizing current generated by the magnetizing/demagnetizing circuit is cut off upon magnetization of said plurality of magnetic units, whereby said plurality of magnetic units maintain their magnetism without being continuously supplied with a direct current.

2. The improved electromagnetic chuck of claim 1, wherein said main body comprises a base made of magnetically conductive material and defining said plurality of recesses therein and forming a plurality of protrusions thereon, and said base is assembled with said cover.

3. The improved electromagnetic chuck of claim 2, wherein each said protrusion of said base defines a slot in its top surface so as to create a path for receiving said coils.

4. The improved electromagnetic chuck of claim 1, wherein said main body comprises a plate-like base made of non-magnetically conductive material, and said plurality of magnetically conductive portions of said cover define a plurality of recesses and form a plurality of protrusions.

5. The improved electromagnetic chuck of claim 1, wherein said main body comprises a base made of magnetically conductive material and defining said plurality of recesses therein and forming a plurality of protrusions thereon, and said cover is comprised of a plurality of first magnetically conductive portions, non-magnetically conductive portions and second magnetically conductive portions, said first and second magnetically conductive portions being shaped differently and being alternately arranged with said non-magnetically conductive portions disposed therebetween.

6. The improved electromagnetic chuck of claim 1, wherein said permanent-magnetic material is an oxide of iron, aluminum, nickel, or cobalt.

7. The improved electromagnetic chuck of claim 1, wherein the main body includes gaps, and said gaps within said main body are filled with a non-magnetically conductive material.

8. The improved electromagnetic chuck of claim 1, wherein said plurality of magnetically conductive portions and non-magnetically conductive portions are adhered together.

9. A circuit used for an electromagnetic chuck including a plurality of magnetic units, each said magnetic unit being comprised of a permanent-magnetic material and a coil around said permanent-magnetic material, the circuit comprising:

a magnetizing circuit for generating a direct current signal;

a demagnetizing circuit for generating a pair of positive and negative phase pulse signals with a gradually increased frequency, said demagnetizing circuit comprising:

a linear voltage oscillation generator for generating a series of pulse signals with a gradually increased frequency said linear voltage oscillation generator being comprised of a sawtooth wave generator and a voltage controlled oscillator; and a frequency divider for dividing the frequency of said pair of positive and negative phase signals; and a time delay circuit for respectively adding an appropriate time delay on said pair of positive and negative phase signals from said frequency divider, said time delay circuit being comprised of two sets of resistor and capacitor circuits; and an output circuit electrically connected with said magnetizing circuit and said demagnetizing circuit for outputting said direct current signal or said pair of positive and negative phase pulse signals to said coils of said plurality of magnetic units so as to magnetize or demagnetize said plurality of magnetic units.

10. The circuit of claim 9, wherein said magnetizing circuit comprises a regulator for regulating said direct current signal and an oscillator for generating a basic waveform signal and sending said basic waveform signal to said regulator.

11. The circuit of claim 10, wherein said regulator is comprised a comparator and a variable resistor.

12. The circuit of claim 10, wherein said magnetizing circuit further comprises a switch for controlling the electric power to said magnetizing circuit and a controller for activating said oscillator, said controller is comprised of a D-type flip-flop.

13. The circuit of claim 9, wherein said demagnetizing circuit further comprises a switch for controlling the electric power to said demagnetizing circuit and a controller for activating said linear voltage oscillation generator, said controller being comprised of a D-type flip-flop.

14. The circuit of claim 9, wherein said output circuit comprises four sets of power amplifying circuits arranged as a bridge.

15. The circuit of claim 14, wherein said output circuit is driven by a photo-coupled driving circuit comprised of four photo-couplers.

16. The circuit of claim 9, further comprising:

a start/reset circuit for resetting the operation of said magnetizing circuit or said demagnetizing circuit;

a detection resistor connected with said output circuit; and an overcurrent protection circuit comprised of a comparator, said overcurrent protection circuit being electrically connected between said start/reset circuit and said detection resistor.

17. The circuit of claim 16, further comprising an external protection circuit comprised of a comparator and a relay, said external protection circuit being electrically connected between said detection resistor and other external control circuits.

18. A circuit used for an electromagnetic chuck including a plurality of magnetic units, each said magnetic unit being comprised of a permanent-magnetic material and a coil around said permanent-magnetic material, the circuit comprising:

a magnetizing circuit for generating a direct current signal;

a demagnetizing circuit for generating a pair of positive and negative phase pulse signals with a gradually increased frequency, said demagnetizing circuit comprising:

a linear voltage oscillation generator for generating a series of pulse signals with a gradually increased frequency, said linear voltage oscillation generator being comprised of a sawtooth wave generator and a voltage controlled oscillator; and a frequency divider for dividing the frequency of said pair of positive and negative phase signals; and an output circuit electrically connected with said magnetizing circuit and said demagnetizing circuit for outputting said direct current signal or said pair of positive and negative phase pulse signals to said coils of said plurality of magnetic units so as to magnetize or demagnetize said plurality of magnetic units.

* * * * *